(12) United States Patent
Suzuki et al.

(10) Patent No.: US 10,518,677 B2
(45) Date of Patent: Dec. 31, 2019

(54) SEAT FRAME OF VEHICLE SEAT (71) Applicant: TOYOTA BOSHOKU KABUSHIKI KAISHA, Aichi-ken (JP)

(72) Inventors: Hiroyuki Suzuki, Aichi-ken (JP); Hiroshi Mizobata, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/980,884

(22) Filed: May 16, 2018

(65) Prior Publication Data

US 2018/0339621 A1   Nov. 29, 2018

(30) Foreign Application Priority Data

May 26, 2017   (JP) .................................. 2017-104354

(51) Int. Cl.
*B60N 2/68*   (2006.01)

(52) U.S. Cl.
CPC ............. *B60N 2/686* (2013.01); *B60N 2/682* (2013.01)

(58) Field of Classification Search
CPC .......... B60N 2/686; B60N 2/68; B60N 2/682
USPC ............. 297/452.24, 452.18, 452.55, 452.21
See application file for complete search history.

(56) References Cited

U.S. PATENT DOCUMENTS

| | | | | |
|---|---|---|---|---|
| 8,919,876 B2 * | 12/2014 | Sawada | ................ | B60N 2/4228 297/216.1 |
| 2004/0155511 A1 * | 8/2004 | Garnweidner | ....... | B60N 2/5825 297/452.18 |
| 2005/0168041 A1 * | 8/2005 | Glance | ..................... | B60N 2/68 297/452.18 |
| 2006/0152060 A1 * | 7/2006 | Nagayama | ............. | B60R 21/20 297/452.18 |
| 2010/0141009 A1 * | 6/2010 | Kirch | ..................... | B23K 20/10 297/452.18 |
| 2010/0264717 A1 | 10/2010 | Fukuda | | |
| 2011/0148173 A1 * | 6/2011 | Westerink | ................ | B60N 2/24 297/452.18 |
| 2013/0193296 A1 | 8/2013 | Hoshi et al. | | |
| 2013/0200677 A1 | 8/2013 | Hoshi et al. | | |

(Continued)

FOREIGN PATENT DOCUMENTS

DE   112010005932 T5   8/2013
JP   5359880   12/2013

OTHER PUBLICATIONS

German Office Action in counterpart Application No. 102018208153.0, dated Sep. 2, 2019 (and English-language translation thereof).

*Primary Examiner* — Milton Nelson, Jr.
(74) *Attorney, Agent, or Firm* — Greenblum & Bernstein, P.L.C.

(57) ABSTRACT

A seat frame including: a cushion frame including: a pair of side frames having a cross section that is a closed section; a front frame; a rear frame; and a plate-shaped panel member disposed between the front frame and the rear frame; and a back frame; wherein the panel member is formed of a material having at least one of a higher specific strength and a higher specific modulus than those of the pair of side frames, the front frame, and the rear frame, a rear end side of the panel member is attached to a lower side of the rear frame and lower sides of the pair of side frames, and a front end side of the panel member is attached to an upper side of the front frame and upper sides of the pair of side frames.

4 Claims, 6 Drawing Sheets

(56) References Cited

U.S. PATENT DOCUMENTS

2013/0214576 A1 8/2013 Hoshi et al.
2014/0300165 A1* 10/2014 Matsumoto ............. B60R 22/26
297/354.1

* cited by examiner

SEAT FRAME OF VEHICLE SEAT

CROSS-REFERENCE TO RELATED APPLICATIONS

This application claims priority from Japanese Patent Application No. 2017-104354 filed on May 26, 2017, the entire contents of which are incorporated herein by reference.

TECHNICAL FIELD

The disclosure relates to a seat frame of a vehicle seat to be mounted on a vehicle such as an automobile, an airplane, a ship, a train.

BACKGROUND

As one seat frame of a vehicle seat, there is a seat frame in which a lower portion of a back frame is connected to a rear portion of a cushion frame having a rectangular frame shape in a top view. Here, the cushion frame is configured in such a manner that a pair of side frames extends in a front and rear direction at an interval in a seat width direction, front end portions of the pair of side frames are connected in a bridging manner by a front frame, rear end portions of the pair of side frames are connected in a bridging manner by a rear frame, and a panel member is disposed between the front frame and the rear frame. In such a type of cushion frame disclosed in Japanese Patent No. 5359880, a panel member formed of an elastically deformable metal plate is disposed between a front pipe serving as the front frame and a rear frame serving as the rear frame. A cushion pad serving as a cushion body is placed on the panel member. Further, a lower portion of a back frame is connected to a rear portion of each of the pair of side frames via a recliner.

In the seat frame described above, the panel member of the cushion frame has a function of supporting the cushion pad, but does not have a function of enhancing the strength and rigidity of the pair of side frames, the front frame, and the rear frame. Therefore, it has been demanded to provide a seat frame with a cushion frame, which can be reduced in weight as a whole by imparting a function of reinforcing the pair of side frames, the front frame, and the rear frame to the panel member.

SUMMARY

The disclosure aims to provide a seat frame which includes a cushion frame including a panel member configured to support a cushion pad and which can be reduced in weight by a reasonable structure.

According to an aspect of the disclosure, there is provided a seat frame of a vehicle seat, the seat frame including: a cushion frame including: a pair of side frames extending in a front and rear direction at an interval in a seat width direction and having a cross section that is a closed section; a front frame connecting front end sides of the pair of side frames in a bridging manner; a rear frame connecting rear end sides of the pair of side frames in a bridging manner; and a plate-shaped panel member disposed between the front frame and the rear frame and configured to place and support a cushion pad serving as a cushioning material thereon; and a back frame, wherein a lower portion of the back frame is connected to a rear portion of each of the pair of side frames, and wherein the panel member is formed of a material having at least one of a higher specific strength and a higher specific modulus than those of the pair of side frames, the front frame, and the rear frame, a rear end side of the panel member is attached to a lower side of the rear frame and lower sides of the pair of side frames, and a front end side of the panel member is attached to an upper side of the front frame and upper sides of the pair of side frames.

Accordingly, when a large load of bending the back frame forward about a mounting portion with the cushion frame is applied to the back frame due to the front collision or the like of a vehicle, a bending force in a direction to lift the rear portion occurs in the cushion frame. The bending force causes a large tensile stress in the front and rear direction to be generated on the lower side of the rear frame disposed at the rear portion of the cushion frame and the lower side of the pair of side frames. Further, when an occupant is normally seated, a tensile stress in the front and rear direction is generated on the upper side of the front frame disposed at the front portion of the cushion frame and the upper side of the pair of side frames. Here, on the lower side of the rear frame and the lower side of the pair of side frames, and on the upper side of the front frame and the upper side of the pair of side frames, the panel member formed of a material having at least one of a higher specific strength and a higher specific modulus than those of the pair of side frames, the front frame, and the rear frame is attached. In this manner, since the pair of side frames, the front frame, and the rear frame are reinforced by the panel member while suppressing an increase in weight, the weight of the seat frame can be reduced.

DETAILED DESCRIPTION

FIGS. 1 to 6 show a first embodiment of the disclosure. This embodiment represents an example in which the disclosure is applied to a seat frame of an automobile seat. In each drawing, respective directions of an automobile and an automobile seat in the state where the automobile seat including a seat frame is mounted on a floor of the automobile are indicated by arrows. In the following, the descriptions relating to the directions will be made on the basis of these directions.

Figure 1:
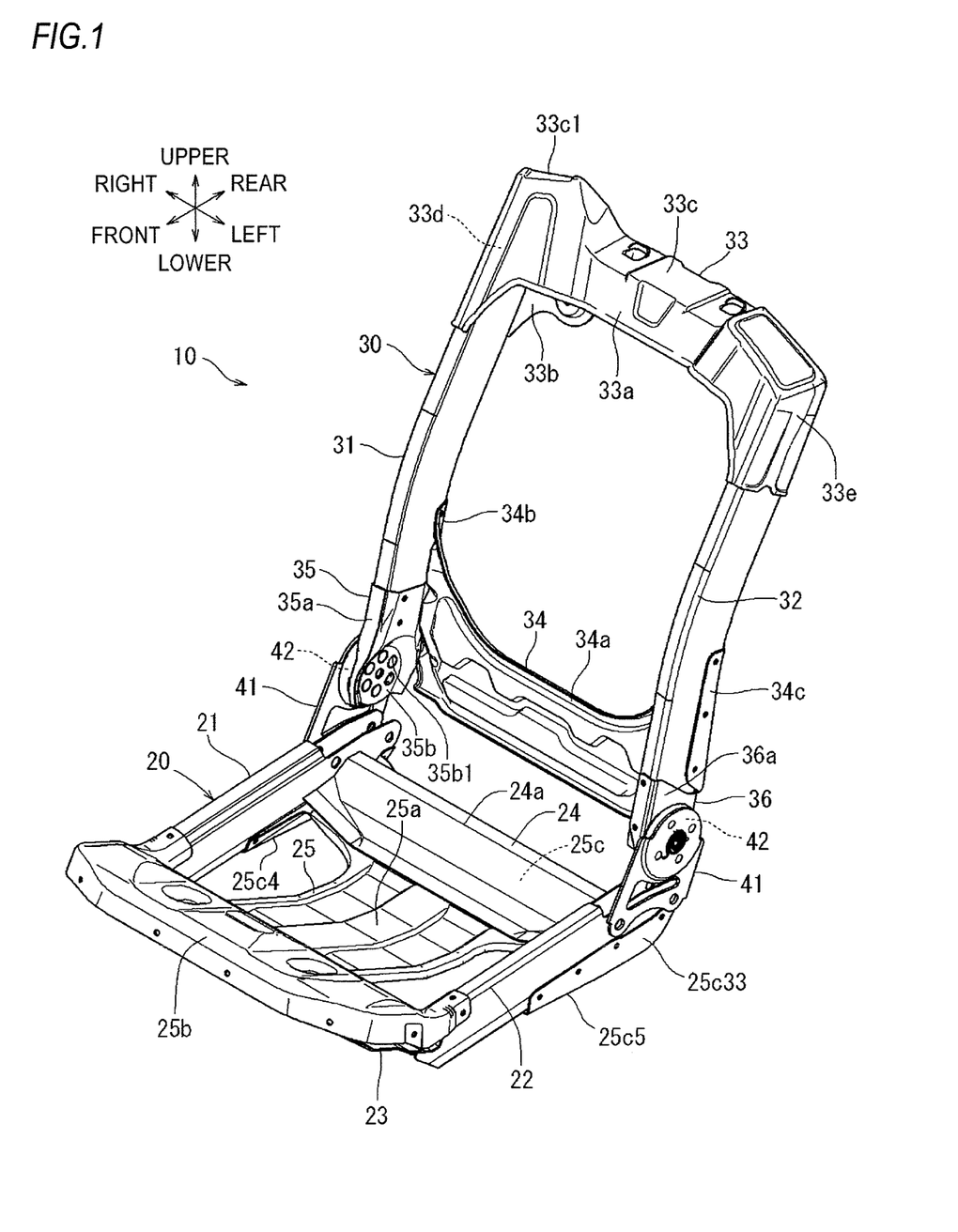
FIG. 1 is a perspective view of a seat frame of an automobile seat according to a first embodiment of the disclosure.

As shown in FIG. 1, a seat frame 10 of the present embodiment is a seat frame of a right automobile seat with a built-in seatbelt. A webbing take-up device (not shown) of a seatbelt device can be attached to the seat frame 10. The seat frame 10 includes a cushion frame 20 forming a framework of a seat cushion supporting the buttock and thigh of a seated occupant, and a back frame 30 forming a framework of a seat back supporting the back of a seated occupant.

Figure 2:
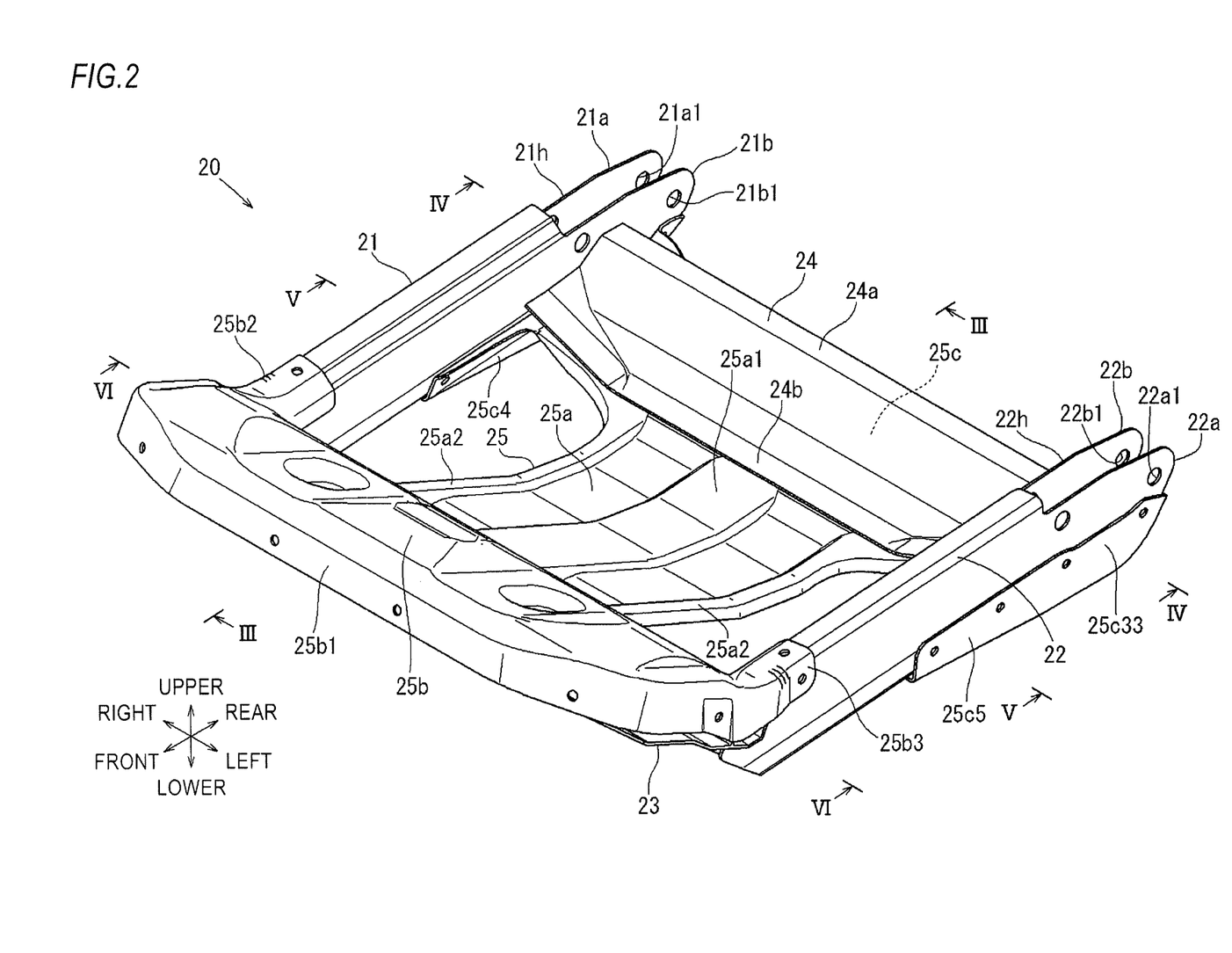
FIG. 2 is a perspective view of a cushion frame in the above embodiment.

As shown in FIGS. 1 and 2, the cushion frame 20 includes a right side frame 21 and a left side frame 22 extending in a front and rear direction on both side portions in a seat width direction, a front frame 23, a rear frame 24, and a panel member 25. Here, the right side frame 21 and the left side frame 22 correspond to "a pair of side frames" in the claims.

Figure 5:
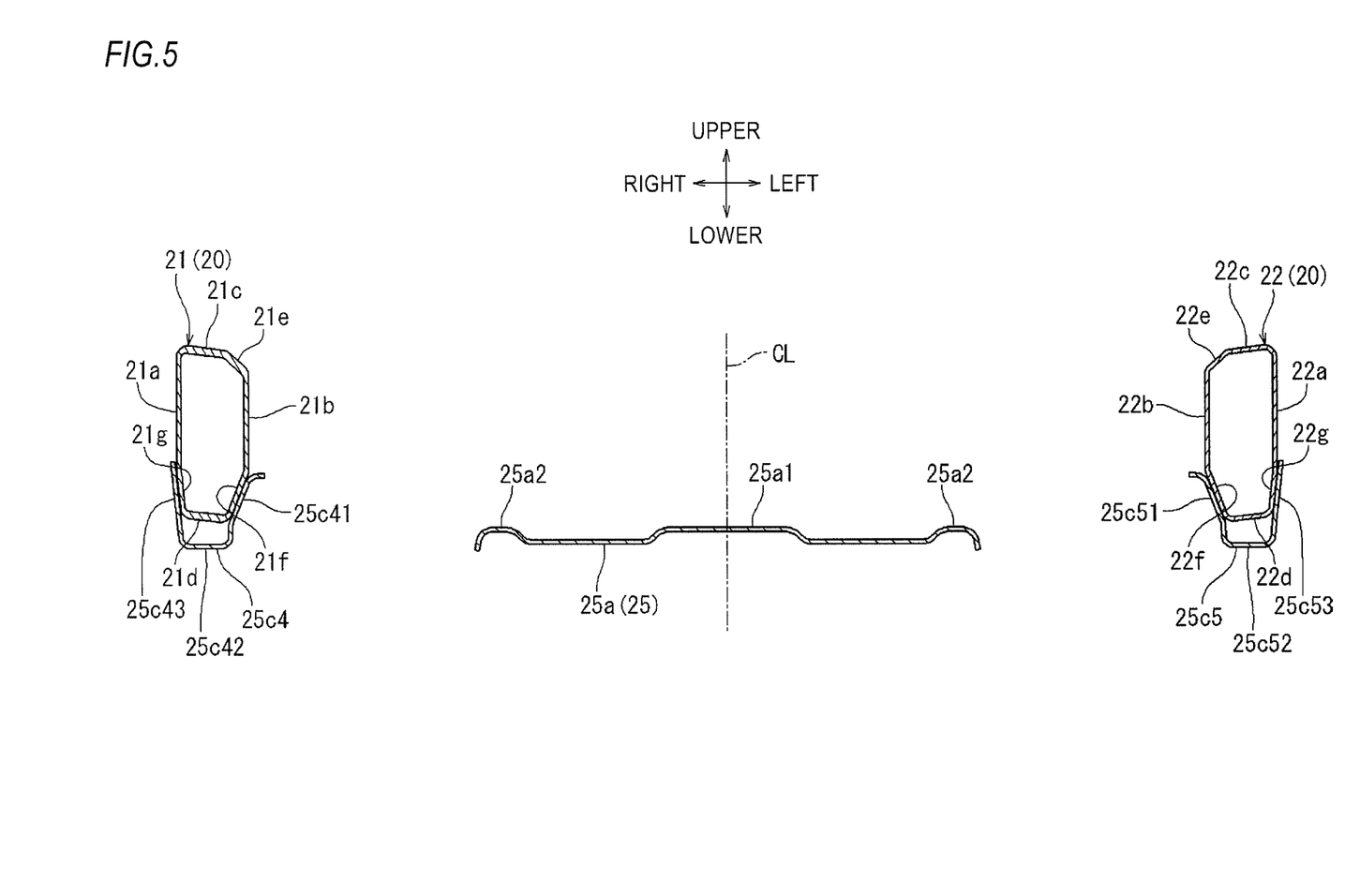
FIG. 5 is a sectional view taken along the line V-V in FIG. 2.

The right side frame 21 is made of an extruded material of an aluminum alloy having a sectional shape shown in FIG. 5 as a base. In FIG. 5, the cross section of the right side frame 21 has a deformed heptagonal shape. The right side frame 21 has a right surface portion 21a, a left surface portion 21b, an upper surface portion 21c, a lower surface portion 21d, an upper left chamfered portion 21e, a lower left chamfered portion 21f, and a lower right chamfered portion 21g. The right surface portion 21a and the left surface portion 21b extend parallel to each other in a seat upper and lower direction. The upper surface portion 21c and the lower surface portion 21d extend parallel to each other while being slightly inclined to the left lower side with respect to a seat left and right direction. The upper left chamfered portion 21e is a portion that extends so as to connect a left end portion of the upper surface portion 21c and an upper end portion of the left surface portion 21b. The upper left chamfered portion 21e has an inclination angle of about 45 degrees with respect to the left surface portion 21b. The lower left chamfered portion 21f is a portion that extends so as to connect a left end portion of the lower surface portion 21d and a lower end portion of the left surface portion 21b. The lower left chamfered portion 21f has an inclination angle of about 30 degrees with respect to the left surface portion 21b. The lower right chamfered portion 21g is a portion that extends so as to connect a right end portion of the lower surface portion 21d and a lower end portion of the right surface portion 21a. The lower right chamfered portion 21g has an inclination angle of about 5 degrees with respect to the right surface portion 21a.

The left side frame 22 is made of an extruded material of an aluminum alloy having a sectional shape shown in FIG. 5 as a base. In FIG. 5, the cross section of the left side frame 22 has a deformed heptagonal shape. The left side frame 22 has a left surface portion 22a, a right surface portion 22b, an upper surface portion 22c, a lower surface portion 22d, an upper right chamfered portion 22e, a lower right chamfered portion 22f, and a lower left chamfered portion 22g. The left surface portion 22a and the right surface portion 22b extend parallel to each other in the seat upper and lower direction. The upper surface portion 22c and the lower surface portion 22d extend parallel to each other while being slightly inclined to the right lower side with respect to the seat left and right direction. The upper right chamfered portion 22e is a portion that extends so as to connect a right end portion of the upper surface portion 22c and an upper end portion of the right surface portion 22b. The upper right chamfered portion 22e has an inclination angle of about 45 degrees with respect to the right surface portion 22b. The lower right chamfered portion 22f is a portion that extends so as to connect a right end portion of the lower surface portion 22d and a lower end portion of the right surface portion 22b. The lower right chamfered portion 22f has an inclination angle of about 30 degrees with respect to the right surface portion 22b. The lower left chamfered portion 22g is a portion that extends so as to connect a left end portion of the lower surface portion 22d and a lower end portion of the left surface portion 22a. The lower left chamfered portion 22g has an inclination angle of about 5 degrees with respect to the left surface portion 22a.

As shown in FIG. 5, an external line of the cross-sectional shape of the right side frame 21 and an external line of the cross-sectional shape of the left side frame 22 are in a line symmetrical relation with respect to a center line CL in the left and right direction of the cushion frame 20. Further, the thickness of the right surface portion 21a and the left surface portion 21b of the right side frame 21 is substantially equal to that of the left surface portion 22a and the right surface portion 22b of the left side frame 22. On the other hand, the thickness of the upper surface portion 21c and the lower surface portion 21d of the right side frame 21 is approximately twice that of the upper surface portion 22c and the lower surface portion 22d of the left side frame 22. The reason is that the geometrical moment of inertia should be increased in order to cope with the situation that the bending load applied to the right side frame 21 from the back frame 30 is larger than the load applied to the left side frame 22 at the time of front collision of an automobile. The reason why the bending load applied to the right side frame 21 is larger than the load applied to the left side frame 22 is that a belt guide portion 33c1 for guiding a webbing of a seatbelt device is disposed on an upper side of the right side frame of the back frame 30, and thus, a larger load is applied to the right side frame 21 via a seatbelt at the time of front collision of an automobile.

Figure 4:
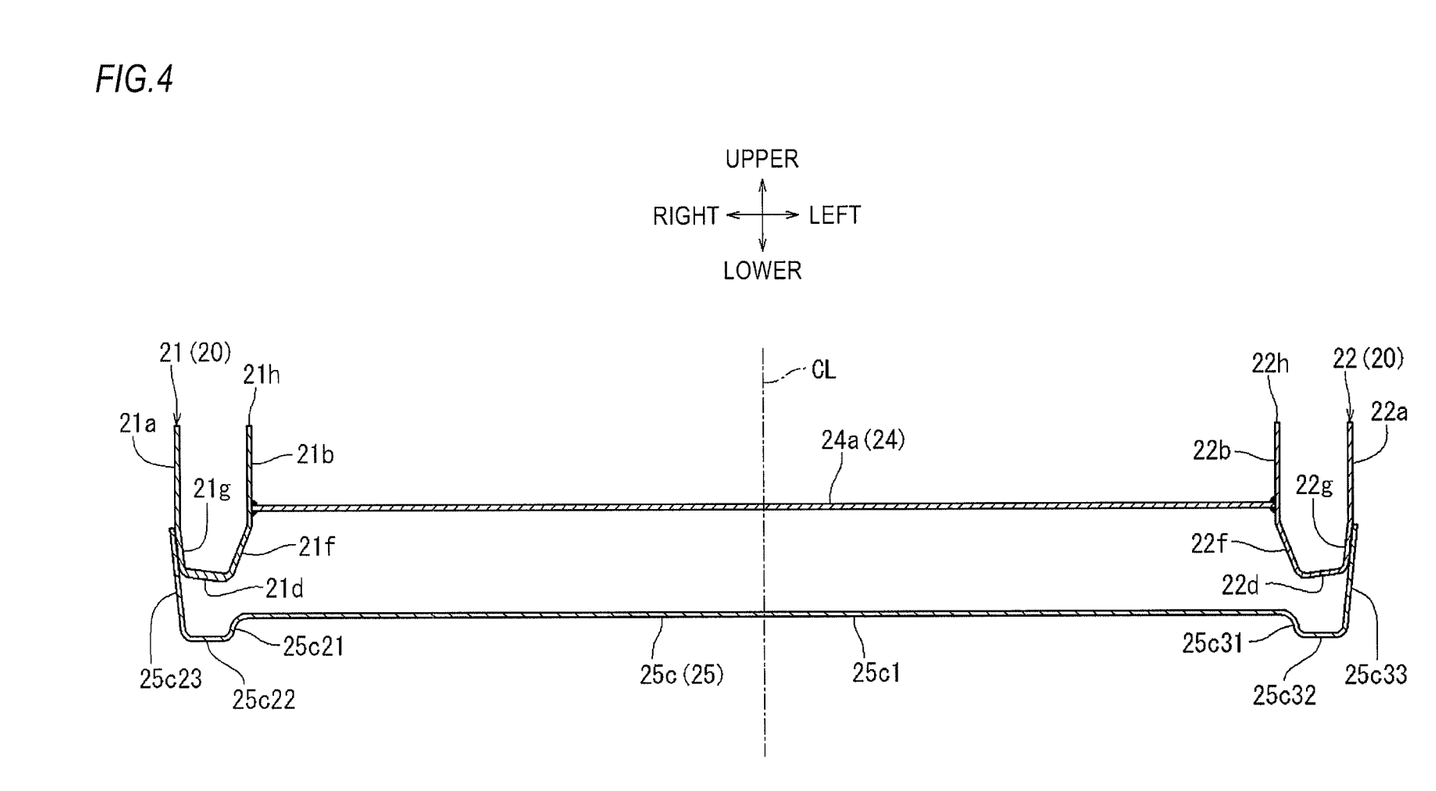
FIG. 4 is a sectional view taken along the line IV-IV in FIG. 2.

As shown in FIGS. 2 and 4, in a rear upper portion of the right side frame 21, the upper portions of the right surface portion 21a and the left surface portion 21b are cut off to form a rear notch 21h. Two bolt holes 21a1 and two bolt holes 21b1 are provided at the portions of the right surface portion 21a and the left surface portion 21b corresponding to the rear notch 21h, respectively. Bolts (not shown) are passed through the bolt holes 21a1 and the bolt holes 21b1, so that a lower end side of a lower arm 41 (to be described later) is fixedly fastened to a right surface of the right surface portion 21a. In a rear upper of the left side frame 22, the upper portions of the left surface portion 22a and the right surface portion 22b are cut off to form a rear notch 22h. Two bolt holes 22a1 and two bolt holes 22b1 are provided at the portions of the left surface portion 22a and the right surface portion 22b corresponding to the rear notch 22h, respectively. Bolts (not shown) are passed through the bolt holes 22a1 and the bolt holes 22b1, so that the lower end side of the lower arm 41 (to be described later) is fixedly fastened to a left surface of the left surface portion 22a. A front notch (not shown) is provided in each of a front upper portion of the right side frame 21 and a front upper portion of the left side frame 22. The front notches are engaged with closed section portion 23a of the front frame 23 (to be described later) to fixedly connect the front frame 23 to the right side frame 21 and the left side frame 22.

Figure 3:
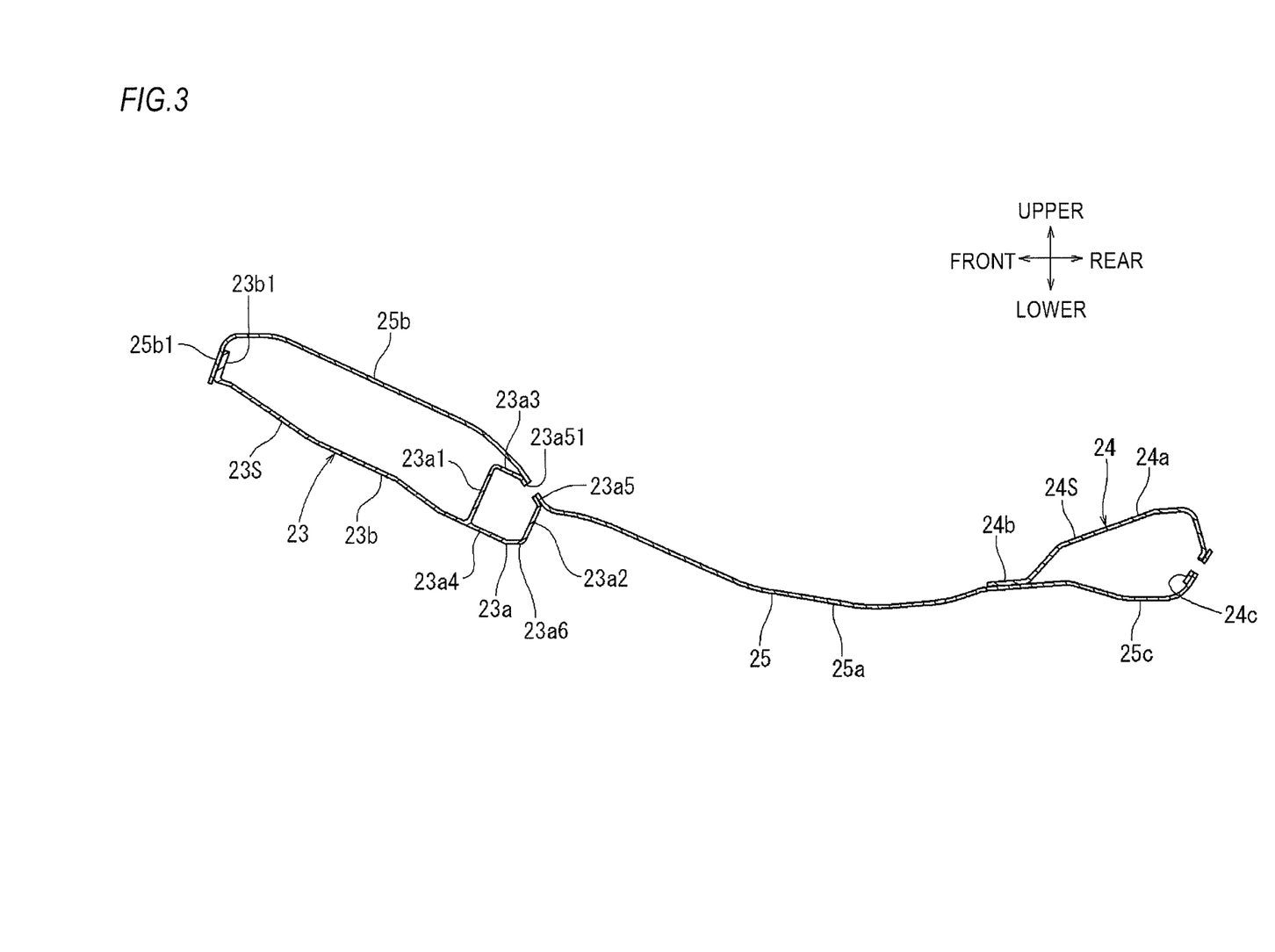
FIG. 3 is a sectional view taken along the line in FIG. 2.

As shown in FIGS. 2 to 4, the rear frame 24 is made of an extruded material of an aluminum alloy having a substantially inverted U-shaped cross sectional shape opened downward as a base. Specifically, in FIG. 3, the rear frame 24 has a main body portion 24a having a substantially inverted U-shaped cross sectional shape opened downward, a front flange portion 24b extending forward from a front end portion of the main body portion 24a, and a rear flange portion 24c extending forward and downward from a rear end portion of the main body portion 24a. The front flange portion 24b and the rear flange portion 24c are in contact with and connected to an upper surface of a rear plate portion 25c of the panel member 25 (to be described later) to form a rear closed section portion 24S. A right end portion of the rear frame 24 abuts against a rear end side of the left surface portion 21b of the right side frame 21 from the left and is connected thereto by welding. Further, a left end portion of the rear frame 24 abuts against a rear end side of the right surface portion 22b of the left side frame 22 from the right and is connected thereto by welding. Here, a front right corner portion and a front left corner portion of the rear frame 24 are bent so as to follow the shape of the panel member 25. Here, the main body portion 24a having a substantially inverted U-shaped cross sectional shape opened downward corresponds to the "first opened section portion" in the claims. Further, the rear closed section portion 24S corresponds to the "first closed section portion" in the claims.

Figure 6:
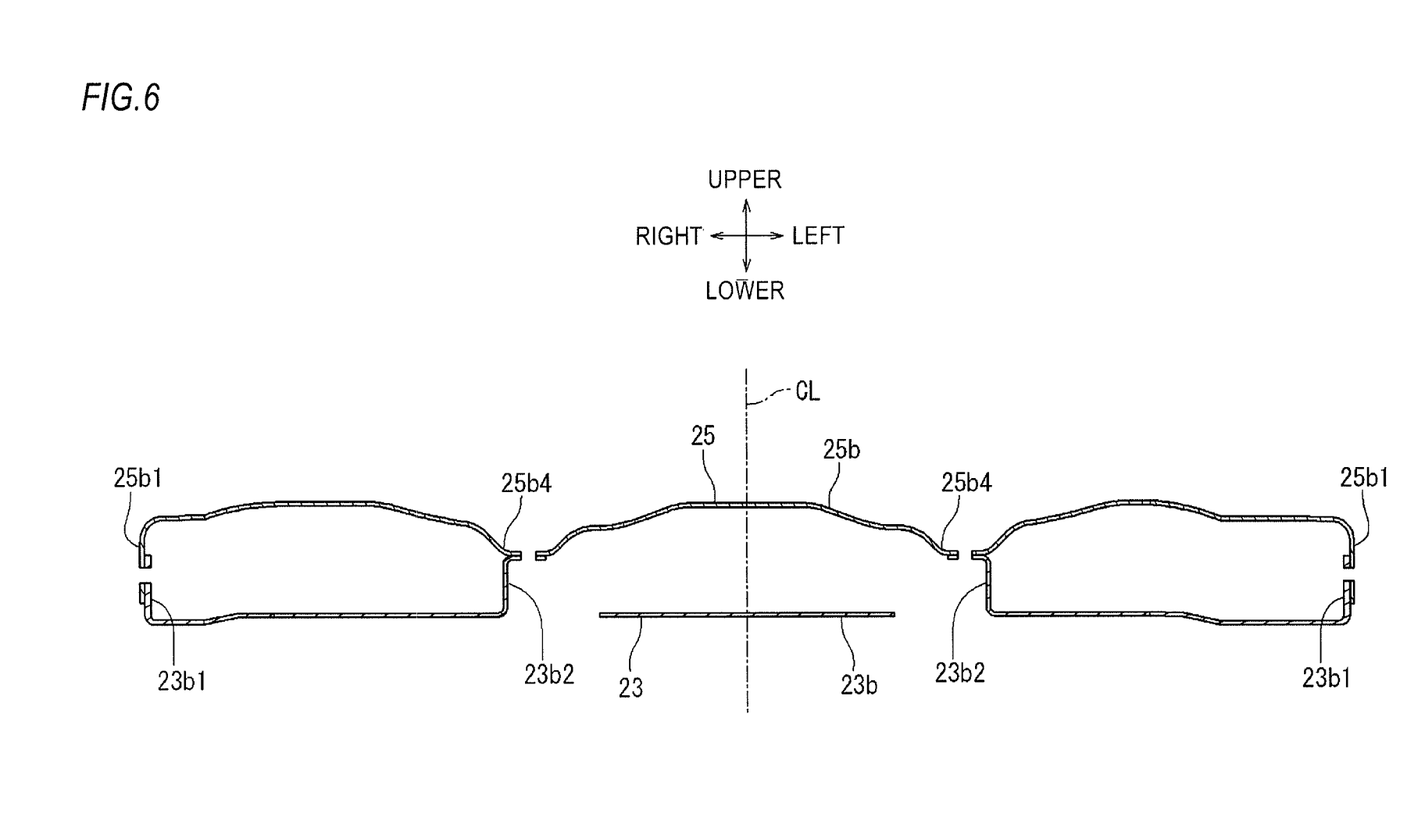
FIG. 6 is a sectional view taken along the line VI-VI in FIG. 2.

As shown in FIGS. 2, 3 and 6, the front frame 23 is made of, as a base, an extruded material of an aluminum alloy having a cross sectional shape which has the closed section portion 23a at the rear portion and a plate-shaped portion 23b at the front portion. Specifically, in FIG. 3, the closed section portion 23a has a deformed hexagonal shape. The closed section portion 23a has a front wall portion 23a1, a rear wall portion 23a2, an upper wall portion 23a3, a lower wall portion 23a4, a rear upper chamfered wall portion 23a5, and a rear lower chamfered wall portion 23a6. The front wall portion 23a1 and the rear wall portion 23a2 extend parallel to each other toward the front lower side. The upper wall portion 23a3 and the lower wall portion 23a4 extend parallel to each other in a direction perpendicular to the front wall portion 23a1 and the rear wall portion 23a2. The rear upper chamfered wall portion 23a5 is a portion that extends so as to connect a rear end portion of the upper wall portion 23a3 and an upper end portion of the rear wall portion 23a2. The rear upper chamfered wall portion 23a5 has an inclination angle of about 30 degrees with respect to the upper wall portion 23a3. The rear lower chamfered wall portion 23a6 is a portion that extends so as to connect a rear end portion of the lower wall portion 23a4 and a lower end portion of the rear wall portion 23a2. The rear lower chamfered wall portion 23a6 has an inclination angle of about 30 degrees with respect to the lower wall portion 23a4. The plate-shaped portion 23b is formed in a flat plate shape in which the lower wall portion 23a4 extends forward and upward. In a state where the rear lower chamfered wall portion 23a6 of the closed section portion 23a is aligned substantially to the horizontal direction, the front frame 23 is connected to a front upper portion of the right side frame 21 and a front upper portion of the left side frame 22 by welding in a state of being engaged with a front notch (not shown). A plurality of cut-and-raised portions 23b1 for riveting with a front bent portion 25b1 of the panel member 25 (to be described later) is provided at a front end portion and left and right end portions of the plate-shaped portion 23b. A pair of left and right cut-and-raised portions 23b2 is provided substantially at the center portion in the front and rear direction of the plate-shaped portion 23b. Further, a plurality of rivet holes 23a51 is provided in the rear upper chamfered wall portion 23a5. The rivet holes 23a51 are provided for riveting with a rear end portion of a front plate portion 25b of the panel member 25. The front frame 23 is connected to the front plate portion 25b of the panel member 25 to form a front closed section portion 23S. Here, the upwardly opened portion formed by the plate-shaped portion 23b and the front wall portion 23a1 corresponds to the "second opened section portion" in the claims. Further, the front closed section portion 23S corresponds to the "second closed section portion" in the claims.

As shown in FIGS. 2 to 6, the panel member 25 is a carbon fiber-reinforced composite resin molded article obtained by curing a plurality of laminated carbon fiber fabrics with a matrix resin of epoxy resin. The panel member 25 has a middle plate portion 25a, a front plate portion 25b, and a rear plate portion 25b. The middle plate portion 25a is positioned between the front frame 23 and the rear frame 24, and the length in the seat width direction thereof is about a half of the length between the left surface portion 21b of the right side frame 21 and the right surface portion 22b of the left side frame 22. As shown in FIG. 3, the middle plate portion 25a is formed such that the rear portion thereof is substantially horizontal and the front portion thereof extends forward and upward from a front end portion of the rear portion. Further, as shown in FIG. 5, one central rib 25a1 and two side ribs 25a2 protruding upward for securing rigidity are disposed on the middle plate portion 25a so as to extend in the front and rear direction.

As shown in FIGS. 2 to 6, the front plate portion 25b is positioned above the front frame 23, and the length in the seat width direction thereof is substantially equal to the length between the right surface portion 21a of the right side frame 21 and the left surface portion 22a of the left side frame 22. As shown in FIG. 3, the front plate portion 25b extends forward and upward from a rear end side to a front end side and extends in a curved manner so as to be convex upward. A front end portion and left and right end portions of the front plate portion 25b are formed as the front bent portion 25b1 bent downward and forward. Further, a right upper connection portion 25b2 extending rearward is provided at a rear right end portion of the front plate portion 25b. The right upper connection portion 25b2 has a cross section that is a substantially inverted U-shaped opened section opened downward. Furthermore, a left upper connection portion 25b3 extending rearward is provided at a rear left end portion of the front plate portion 25b. The left upper connection portion 25b3 has a cross section that is a substantially inverted U-shaped opened section opened downward. An internal line of the cross section of the right upper connection portion 25b2 is formed so as to correspond to an upper side of an external line of the cross section of the right side frame 21. Further, an internal line of the cross section of the left upper connection portion 25b3 is formed so as to correspond to an upper side of an external line of the cross section of the left side frame 22. In addition, a pair of left and right mounting recess portions 25b4 are provided at positions of the front plate portion 25b corresponding to the cut-and-raised portions 23b2 of the front frame 23. The front plate portion 25b is riveted to the front frame 23 at a plurality of positions of the front bent portion 25b1, a plurality of positions of the rear end portion and the mounting recess portions 25b4. Further, the front plate portion 25b is riveted in a state where the right upper connection portion 25b2 is engaged with the right side frame 21, and the left upper connection portion 25b3 is engaged with the left side frame 22.

As shown in FIGS. 2 to 6, the rear plate portion 25c is positioned above the rear frame 24, and the length in the seat width direction thereof is substantially equal to the length between the right surface portion 21a of the right side frame 21 and the left surface portion 22a of the left side frame 22. As shown in FIG. 3, the rear plate portion 25c is formed to extend in a curved manner so as to be convex slightly downward from a front end side to a rear end side. Further, as shown in FIG. 4, the rear plate portion 25c has a main portion 25c1 that extends in the seat width direction so as to face the main body portion 24a of the rear frame 24. Further, the rear plate portion 25c has a right inner wall portion 25c21 extending toward the lower right side from a right end portion of the main portion 25c1, a right bottom wall portion 25c22 extending to the right side in parallel with the main portion 25c1 from a right end portion of the right inner wall portion 25c21, and a right outer wall portion 25c23 extending toward the upper right side from a right end portion of the right bottom wall portion 25c22. Furthermore, the rear plate portion 25c has a left inner wall portion 25c31 extending toward lower left side from a left end portion of the main portion 25c1, a left bottom wall portion 25c32 extending to the left side in parallel with the main portion 25c1 from a left end portion of the left inner wall portion 25c31, and a left outer wall portion 25c33 extending toward the upper left side from a left end portion of the left bottom wall portion 25c32. A left surface on the upper end side of the right outer wall portion 25c23 is riveted at a plurality of positions in a state of being in contact with a right surface of the lower right chamfered portion 21g of the right side frame 21. A right surface on the upper end side of the left outer wall portion 25c33 is riveted at a plurality of positions in a state of being in contact with a left surface of the lower left chamfered portion 22g of the left side frame 22.

As shown in FIGS. 2 and 5, a right lower connection portion 25c4 extending forward is provided at a front right end portion of the rear plate portion 25c. The right lower connection portion 25c4 has a cross section that is a substantially U-shaped opened section opened upward. Further, a left lower connection portion 25c5 extending forward is provided at a front left end portion of the rear plate portion 25c. The left lower connection portion 25c5 has a cross section that is a substantially U-shaped opened section opened upward. Front end portions of the right lower connection portion 25c4 and the left lower connection portion 25c5 are positioned in the vicinity of the central portion in the front and rear direction of the right side frame 21 and the left side frame 22. As shown in FIG. 5, the right lower connection portion 25c4 has a right inner surface portion 25c41, and a right bottom surface portion 25c42 extending to the right side from a lower end portion of the right inner surface portion 25c41. A right surface on the upper end side of the right inner surface portion 25c41 is in contact with a left surface of the lower left chamfered portion 21f of the right side frame 21. Furthermore, the right lower connection portion 25c4 has a right outer surface portion 25c43 extending toward the upper right side from a right end portion of the right bottom surface portion 25c42. A left surface on the upper end side of the right outer surface portion 25c43 is in contact with a right surface of the lower right chamfered portion 21g of the right side frame 21. The right inner surface portion 25c41, the right bottom surface portion 25c42, and the right outer surface portion 25c43 are formed to be smoothly continuous with the right inner wall portion 25c21, the right bottom wall portion 25c22, and the right outer wall portion 25c23, respectively. An upper end side of the right inner surface portion 25c41 and the lower left chamfered portion 21f, and an upper end side of the right outer surface portion 25c43 and the lower right chamfered portion 21g are riveted in a state of being in contact with each other as described above. At this time, the right bottom wall portion 25c22 is separated from the lower surface portion 21d. The left lower connection portion 25c5 has a left inner surface portion 25c51, and a left bottom surface portion 25c52 extending to the left side from a lower end portion of the left inner surface portion 25c51. A left surface on the upper end side of the left inner surface portion 25c51 is in contact with a right surface of the lower right chamfered portion 22f of the left side frame 22. Furthermore, the left lower connection portion 25c5 has a left outer surface portion 25c53 that extends toward the upper left side from a left end portion of the left bottom surface portion 25c52. A right surface on the upper end side of the left outer surface portion 25c53 is in contact with a left surface of the lower left chamfered portion 22g of the left side frame 22. The left inner surface portion 25c51, the left bottom surface portion 25c52, and the left outer surface portion 25c53 are formed to be smoothly continuous with the left inner wall portion 25c31, the left bottom wall portion 25c32, and the left outer wall portion 25c33, respectively. An upper end side of the left inner surface portion 25c51 and the lower right chamfered portion 22f, and an upper end side of the left outer surface portion 25c53 and the lower left chamfered portion 22g are riveted in a state of being in contact with each other as described above. At this time, the left bottom surface portion 25c52 is separated from the lower surface portion 22d. The right lower connection portion 25c4 and the left lower connection portion 25c5 correspond to the "connection portion" in the claims, respectively.

As shown in FIG. 1, the back frame 30 includes a right side frame 31 and a left side frame 32 extending in the upper and lower direction on both side portions in the seat width direction, an upper frame 33, a lower frame 34, a right upper arm 35, and a left upper arm 36. The right side frame 31 is made of an extruded material of an aluminum alloy having the same sectional shape as the right side frame 21 of the cushion frame 20 as a base. The right side frame 31 is formed by placing the base member in such an orientation as to set the upper surface portion 21c of the right side frame 21 as the front surface side and bending the base member so as to be convex forward in the vicinity of the central portion in the upper and lower direction. Further, the left side frame 32 is made of an extruded material of an aluminum alloy having the same sectional shape as the left side frame 22 of the cushion frame 20 as a base. The left side frame 32 is formed by placing the base member in such an orientation as to set the upper surface portion 22c of the left side frame 22 as the front surface side and bending the base member so as to be convex forward in the vicinity of the central portion in the upper and lower direction. The right upper arm 35 that is a press part made of iron is attached to a lower end side of the right side frame 31. The right upper arm 35 is a part formed as one part by combining two parts in a state of facing each other. An upper portion of the right upper arm 35 is formed as a side frame connection portion 35a so that an internal line of a horizontal section corresponds to an external line of the cross-sectional shape of the right side frame 31. Further, a lower portion of the right upper arm 35 is formed as a flat plate-shaped recliner connection portion 35b and has recliner connection holes 35b1 formed therein. The right side frame 31 is fastened and connected to the right upper arm 35 by rivets (not shown) in a state where the lower end side of the right side frame 31 is inserted into the side frame connection portion 35a of the right upper arm 35. The left upper arm 36 that is a press part made of iron is attached to a lower end side of the left side frame 32. The left upper arm 36 is a plate-shaped press molded part. An upper portion of the left upper arm 36 is formed as a side frame connection portion 36a so as to correspond to the front side, the left side and the rear side of the external line of the cross sectional shape of the left side frame 32. Further, a lower portion of the left upper arm 36 is formed as a flat plate-shaped recliner connection portion (not shown). The left upper arm 36 is fastened and connected to the left side frame 32 by rivets (not shown) in a state where the side frame connection portion 36a of the left upper arm 36 is in contact with the lower end side of the left side frame 32.

As shown in FIG. 1, the upper frame 33 is a member having a substantially inverted U-shaped cross section opened downward. The upper frame 33 is a carbon fiber-reinforced composite resin molded article obtained by curing a plurality of laminated carbon fiber fabrics with a matrix resin of epoxy resin. The upper frame 33 has a front wall portion 33a, a rear wall portion 33b, an upper wall portion 33c, a right wall portion 33d, and a left wall portion 33e. The belt guide portion 33c1 is provided on the right end side of the upper wall portion 33c. The belt guide portion 33c1 functions to guide a webbing (not shown) of a seatbelt device released from a webbing take-up device (not shown) disposed inside a seat back from a back surface of the back frame 30 toward a front surface of an upper body of a seated occupant. When the upper frame 33 is put on the upper end sides of the right side frame 31 and the left side frame 32 from above, a left surface of the right wall portion 33d is formed to be abutted against a right surface of the right side frame 31. Further, when the upper frame 33 is put on the upper end sides of the right side frame 31 and the left side frame 32 from above, a right surface of the left wall portion 33e is formed to be abutted against a left surface of the left side frame 32.

As shown in FIG. 1, the lower frame 34 has a substantially U shape in a front view. The lower frame 34 is a carbon fiber-reinforced composite resin molded article obtained by curing a plurality of laminated carbon fiber fabrics with a matrix resin of epoxy resin. The lower frame 34 has a main portion 34a, a right connection portion 34b that is a connection portion with a lower end side of the right side frame 31, and a left connection portion 34c that is a connection portion with a lower end side of the left side frame 32. The right connection portion 34b is formed to be fittable to the lower end side of the right side frame 31 from the rear side. The right connection portion 34b is fastened and connected by rivets (not shown) in a fitted state. The left connection portion 34c is formed to be fittable to the lower end side of the left side frame 32 from the rear side. The left connection portion 34c is fastened and connected by rivets (not shown) in a fitted state.

As shown in FIG. 1, the lower arms 41 are plate-shaped members made of a thick steel plate. A left surface on the upper end side of the right lower arm 41 is attached to the right upper arm 35 of the back frame 30 via a recliner 42. A right surface on the upper end side of the left lower arm 41 is attached to the left upper arm 36 of the back frame 30 via the recliner 42. Further, the right lower arm 41 is fixedly fastened by passing a bolt into a bolt hole provided on the lower side and inserting the bolt into the bolt hole 21a1 and the bolt hole 21b1 of the right side frame 21 from the right side. Further, the left lower arm 41 is fixedly fastened by passing a bolt into a bolt hole provided on the lower side and inserting the bolt into the bolt hole 22a1 and the bolt hole 22b1 of the left side frame 22 from the left side. In this way, the back frame 30 is attached to the cushion frame 20 so that its inclination angle can be adjusted.

The present embodiment configured as described above provides the following operational effects. When a large forward load is applied to the belt guide portion 33c1 of the back frame 30 via a seatbelt due to the front collision or the like of an automobile, a bending force in a direction to lift the rear portion around a pivot shaft of the recliner 42 occurs in the cushion frame 20. The bending force causes a large tensile stress in the front and rear direction to be generated in the portion between the front flange portion 24b and the rear flange portion 24c forming the lower side of the rear frame 24 of the cushion frame 20, the side of the lower surface portion 21d of the right side frame 21, and the side of the lower surface portion 22d of the left side frame 22. Here, a carbon fiber-reinforced composite resin having a higher specific strength and specific modulus than aluminum alloy is disposed between the front flange portion 24b and the rear flange portion 24c of the rear frame 24. Further, the right lower connection portion 25c4 and the left lower connection portion 25c5 of the panel member 25 made of a carbon fiber-reinforced composite resin having a higher specific strength and specific modulus than aluminum alloy are attached to the side of the lower surface portion 21d of the right side frame 21 and the side of the lower surface portion 22d of the left side frame 22. In this manner, since the rear frame 24, the right side frame 21, and the left side frame 22 are reinforced while suppressing an increase in the weight, the weight of the seat frame 10 can be reduced. Further, when an occupant is normally seated, a tensile stress in the front and rear direction is generated in the portion between the closed section portion 23a and the front end portion of the plate-shaped portion 23b forming the upper side of the front frame 23 disposed on the front portion of the cushion frame 20, the side of the upper surface portion 21c of the right side frame 21, and the side of the upper surface portion 22c of the left side frame 22. Here, the front plate portion 25b made of a carbon fiber-reinforced composite resin having a higher specific strength and specific modulus than aluminum alloy is disposed between the closed section portion 23a and the front end portion of the plate-shaped portion 23b of the front frame 23. Furthermore, the right upper connection portion 25b2 of the front plate portion 25b is connected to the right side frame 21, and the left upper connection portion 25b3 is connected to the left side frame 22. In this manner, since the front frame 23 is reinforced by the panel member 25 while suppressing an increase in the weight, the weight of the seat frame 10 can be reduced.

Further, the right lower connection portion 25c4 of the panel member 25 is riveted and connected to the side of the lower surface portion 21d of the right side frame 21 in a state of being fitted thereto from the lower side. Further, the left lower connection portion 25c5 of the panel member 25 is riveted and connected to the side of the lower surface portion 22d of the left side frame 22 in a state of being fitted thereto from the lower side. In this manner, the geometrical moment of inertia about an axis extending in the seat width direction increases at the portion of the right side frame 21 to which the right lower connection portion 25c4 is connected, and the portion of the left side frame 22 to which the left lower connection portion 25c5 is connected. As a result, it is possible to enhance the strength and rigidity of the cushion frame 20 against a large load applied from the back frame 30 due to the front collision or the like of the vehicle.

Furthermore, the rear frame 24 is configured to form the rear closed section portion 24S extending in the seat width direction between the rear plate portion 25c of the panel member 25 and the rear frame 24, and the front frame 23 is configured to form the front closed section portion 23S extending in the seat width direction between the front plate portion 25b of the panel member 25 and the front frame 23. In this manner, the geometrical moment of inertia of the rear frame 24 and the front frame 23 about an axis extending in the seat front and rear direction can be increased, thereby further enhancing the strength and rigidity of the seat frame 10. In addition, the right side frame 21 and the left side frame 22, the front frame 23, and the rear frame 24 are made of aluminum alloy, and the panel member 25 is made of a carbon fiber-reinforced composite resin. In this way, it is possible to further reduce the weight of the seat frame 10.

Although specific embodiments have been described above, the disclosure is not limited to the appearances and configurations in these embodiments, and various modifications, additions and deletions can be made without changing the spirit of the disclosure. For example, the following configurations can be adopted.

1. In the above embodiment, the right side frame 21 and the left side frame 22, the front frame 23, and the rear frame 24 are made of aluminum alloy, and the panel member 25 is made of a carbon fiber-reinforced composite resin. However, the disclosure is not limited thereto. Any materials may be used so long as the material of the panel member 25 has a higher specific strength and specific modulus than the materials of the right side frame 21 and the left side frame 22, the front frame 23, and the rear frame 24. For example, iron, aluminum alloy, magnesium alloy, titanium alloy and the like may be separately used as the materials of the right side frame 21 and the left side frame 22, the front frame 23, and the rear frame 24, and the panel member 25 may be made of a carbon fiber-reinforced composite resin.

2. In the above embodiment, the right lower connection portion 25c4 and the left lower connection portion 25c5 of the panel member 25 have a cross section that is a substantially U-shaped opened section opened upward. However, the disclosure is not limited thereto. The right lower connection portion 25c4 and the left lower connection portion 25c5 may have a flat plate shape and may be attached to the lower surface portion 21d of the right side frame 21 and the lower surface portion 22d of the left side frame 22. Further, one of the right lower connection portion 25c4 and the left lower connection portion 25c5 may have an opened section, and the other thereof may have a flat plate shape.

3. Although not attached in the above embodiment, an ottoman may be attached to the front end side of the front frame 23 so as to be pivotable in the upper and lower direction. At this time, a bending force is applied to the front frame 23, the right side frame 21, and the left side frame 22 about a pivot shaft where the ottoman is attached to the front frame 23, and a tensile stress in the front and rear direction is generated on the upper side. Even against the tensile stress, the front plate portion 25b of the panel member 25 effectively functions by sharing the tensile stress.

4. In the above embodiment, the disclosure is applied to a back frame of an automobile seat. However, the disclosure may be applied to a seat frame of a seat mounted on an airplane, a ship, a train, or the like.

The disclosure provides illustrative, non-limiting examples as follows:

According to a first aspect of the disclosure, there is provided a seat frame of a vehicle seat, the seat frame including: a cushion frame including: a pair of side frames extending in a front and rear direction at an interval in a seat width direction and having a cross section that is a closed section; a front frame connecting front end sides of the pair of side frames in a bridging manner; a rear frame connecting rear end sides of the pair of side frames in a bridging manner; and a plate-shaped panel member disposed between the front frame and the rear frame and configured to place and support a cushion pad serving as a cushioning material thereon; and a back frame, wherein a lower portion of the back frame is connected to a rear portion of each of the pair of side frames, and wherein the panel member is formed of a material having at least one of a higher specific strength and a higher specific modulus than those of the pair of side frames, the front frame, and the rear frame, a rear end side of the panel member is attached to a lower side of the rear frame and lower sides of the pair of side frames, and a front end side of the panel member is attached to an upper side of the front frame and upper sides of the pair of side frames.

According to the first aspect, when a large load of bending the back frame forward about a mounting portion with the cushion frame is applied to the back frame due to the front collision or the like of a vehicle, a bending force in a direction to lift the rear portion occurs in the cushion frame. The bending force causes a large tensile stress in the front and rear direction to be generated on the lower side of the rear frame disposed at the rear portion of the cushion frame and the lower side of the pair of side frames. Further, when an occupant is normally seated, a tensile stress in the front and rear direction is generated on the upper side of the front frame disposed at the front portion of the cushion frame and the upper side of the pair of side frames. Here, on the lower side of the rear frame and the lower side of the pair of side frames, and on the upper side of the front frame and the upper side of the pair of side frames, the panel member formed of a material having at least one of a higher specific strength and a higher specific modulus than those of the pair of side frames, the front frame, and the rear frame is attached. In this manner, since the pair of side frames, the front frame, and the rear frame are reinforced by the panel member while suppressing an increase in weight, the weight of the seat frame can be reduced.

According to a second aspect of the disclosure, there is provided the seat frame according to the first aspect, wherein the panel member includes connection portions connected to the rear portions of the pair of side frames from the lower side, and wherein each connection portion has a cross-section that is an opened section having a substantially U shape opened upward and is fitted to each closed section of the pair of side frames over a predetermined length in the front and rear direction, and the connection portions are connected to the rear portions of the pair of side frames in a fitted state.

According to the second aspect, the connection portions of the panel member are connected to the rear portions of the pair of side frames in a fitted state from the lower side. In this manner, on the portions of the pair of side frames to which the connection portions are connected, the geometrical moment of inertia about an axis extending in the seat width direction over a predetermined length in the front and rear direction is increased, so that the strength and rigidity of the cushion frame against a large load applied from the back frame due to the front collision or the like of the vehicle can be enhanced.

According to a third aspect of the disclosure, there is provided the seat frame according to the first or second aspect, wherein the rear frame includes a first opened section portion extending in the seat width direction and having a cross section opened downward, wherein the front frame includes a second opened section portion extending in the seat width direction and having a cross section opened upward, wherein the first opened section portion of the rear frame and the panel member is configured to form a first closed section portion extending in the seat width direction when the rear frame is connected to the panel member, and wherein the second opened section portion of the front frame and the panel member is configured to form a second closed section portion extending in the seat width direction when the front frame is connected to the panel member.

According to the third aspect, since the geometrical moment of inertia of the rear frame and the front frame about an axis extending in the seat front and rear direction can be increased, it is possible to further enhance the strength and rigidity of the seat frame.

According to a fourth aspect of the disclosure, there is provided the seat frame according to any one of the first to third aspects, wherein the pair of sides frames, the front frame, and the rear frame are made of a light alloy, and the panel member is made of a carbon fiber reinforced resin.

According to the fourth aspect, it is possible to enhance the effect of reducing the weight of the seat frame by using a light alloy and a carbon fiber reinforced resin having a higher specific strength and specific rigidity than the light alloy.

What is claimed is:

1. A seat frame of a vehicle seat, the seat frame comprising:
a cushion frame including:
a pair of side frames extending in a front and rear direction at an interval in a seat width direction and having a cross section that is a closed section;
a front frame connecting front end sides of the pair of side frames in a bridging manner;
a rear frame connecting rear end sides of the pair of side frames in a bridging manner; and
a plate-shaped panel member disposed between the front frame and the rear frame and configured to place and support a cushion pad serving as a cushioning material thereon; and
a back frame,
wherein a lower portion of the back frame is connected to a rear portion of each of the pair of side frames, and
wherein the panel member is formed of a material having at least one of a higher specific strength and a higher specific modulus than those of the pair of side frames, the front frame, and the rear frame, a rear end side of the panel member is attached to a lower side of the rear frame and lower sides of the pair of side frames, and a front end side of the panel member is attached to an upper side of the front frame and upper sides of the pair of side frames.

2. The seat frame according to claim 1,
wherein the panel member includes connection portions connected to the rear portions of the pair of side frames from the lower side, and
wherein each connection portion has a cross-section that is an opened section having a substantially U shape opened upward and is fitted to each closed section of the pair of side frames over a predetermined length in the front and rear direction, and the connection portions are connected to the rear portions of the pair of side frames in a fitted state.

3. The seat frame according to claim 1,
wherein the rear frame includes a first opened section portion extending in the seat width direction and having a cross section opened downward,
wherein the front frame includes a second opened section portion extending in the seat width direction and having a cross section opened upward,
wherein the first opened section portion of the rear frame and the panel member is configured to form a first closed section portion extending in the seat width direction when the rear frame is connected to the panel member, and
wherein the second opened section portion of the front frame and the panel member is configured to form a second closed section portion extending in the seat width direction when the front frame is connected to the panel member.

4. The seat frame according to claim 1,
wherein the pair of sides frames, the front frame, and the rear frame are made of a light alloy, and the panel member is made of a carbon fiber reinforced resin.

* * * * *